United States Patent [19]

Pecon, Jr.

[11] 4,388,710
[45] Jun. 14, 1983

[54] SUBMARINE CABLE TENSION TELEMETERING SYSTEM

[75] Inventor: Joseph A. Pecon, Jr., Bernardsville, N.J.

[73] Assignee: Bell Telephone Laboratories, Incorporated, Murray Hill, N.J.

[21] Appl. No.: 283,115

[22] Filed: Jul. 13, 1981

[51] Int. Cl.³ .................. H04B 11/00; H02G 1/10
[52] U.S. Cl. .................................... 367/134; 367/6; 367/106; 405/166; 405/168
[58] Field of Search ................. 367/6, 106, 134; 405/158, 166, 168

[56] References Cited

U.S. PATENT DOCUMENTS 3,512,125  5/1970  Raymond ........................ 367/134
4,120,167  10/1978  Denman et al. ............. 405/166 X Primary Examiner—Richard A. Farley

[57] ABSTRACT

Apparatus for monitoring cable tension during submarine laying operations is housed in a separable case suitable for nondestructive attachment around the circumference of a cable at any desired location prior to laying. A strain gauge within the housing is positioned in a saddle across which the cable is placed in a bowed state. The electrical output from the strain gauge, which is proportional to tension in the cable, is translated into an acoustical signal transmissible through a submarine environment. The underwater sound can be picked up by the laying vessel or an assist vessel and displayed in real time. A plurality of tension monitors can be interrogated in sequence or at random under the control of transponder signals from the vessel. The monitor is self-powered and requires no metallic electrical connection to the cable or to the laying vessel.

6 Claims, 4 Drawing Figures

SUBMARINE CABLE TENSION TELEMETERING SYSTEM

BACKGROUND OF THE INVENTION

1. Field of the Invention

This invention relates to submarine cable laying and, in particular, to apparatus for measuring cable tension and telemetering tension and range measurements by wireless means during such operations.

2. Description of the Prior Art

The art of submarine cable laying from surface ships is an ancient one. A recurring problem which has had many partial solutions is that of monitoring cable tension while deploying the cable. Typically, tension in the cable being deployed is measured by passing the cable over a suitably configured load cell positioned just ahead of the outboard launching sheave. It has not been the practice to attempt tension measurements in the cable span between the sea surface and ocean bottom. This arrangement has been reasonably satisfactory as long as cables were ruggedized by external armor. Recently the development of lightweight cables whose strength member is located at the cable core has made possible the streaming of longer continuous cable lengths without reloading. Significant weight reduction has also been attained through the use of glass fibers, which permit expanded signaling bandwidths, but at the expense of greater fragility. Consequently, the monitoring of cable tension during launching operations becomes more critical than heretofore. Greater precision of measurement also becomes necessary.

It is an object of this invention to provide means for monitoring of tension at selected locations along the catenary of a submarine cable during deployment from a surface ship.

It is another object of this invention to provide tension measuring apparatus that is entirely external to the cable being launched and that requires no electrical connection thereto.

An added advantage of this invention is that the same acoustic signals that encode tension measurements are also usable in determining the location and range of the cables with respect to the laying vessel.

SUMMARY OF THE INVENTION

In accordance with this invention, tension and location telemetering apparatus for submarine cables and the like is provided for external attachment at one or more points along a cable length without breach or modification of the cable itself and without the need for electrical connections and without threading pieces over cable ends. In addition, cable tension is detected without significant cable deflection or local stress. The apparatus can be installed on the cable with portable tools at the time of manufacture or shortly before launching on shipboard. No special working environment is required.

The apparatus of the illustrative embodiment of this invention comprises a pair of mating housing shells shaped to be bolted around the cable or its messenger and compartmented to house active telemetering components, a strain-gauge type load cell, a saddle and back-up plate holding the load cell against the cable or messenger, a transponder for electroacoustic signal translation and a local power supply. The shells are attached to the cable in such a way that a bow or arc is formed in the cable at the saddle which also cradles the load cell. Tension on the cable causes a compressive force to develop on the load cell, which in turn causes a relative change in electric current or voltage output from the load. This electrical output is translated in the transponder into an acoustic signal at a frequency which readily propagates through sea water to ship-mounted, buoy-mounted or bottom-mounted transducers. The information so obtained can be retransmitted from such transducers to the more remote cable-launching vessel through normal surface communication channels, e.g. radio, to provide guidance information during laying operations.

The telemetering apparatus in the cable transponders of this invention operates in the undersea environment of an instrumentation array of carefully located bottom-mounted acoustic transponders defining the line of bearing along which the cable is to be laid. These latter transponders both respond to interrogate frequencies, typically in the 9 through 11 kilohertz (kHz) range, and generate reply frequencies, typically in the 7.5 through 13.0 kHz range, in 0.5 kHz increments.

BRIEF DESCRIPTION OF THE DRAWING

The foregoing objects, features and advantages of this invention will be apparent from the following detailed description when read in conjunction with the accompanying drawings in which.

DETAILED DESCRIPTION

Figure 1:
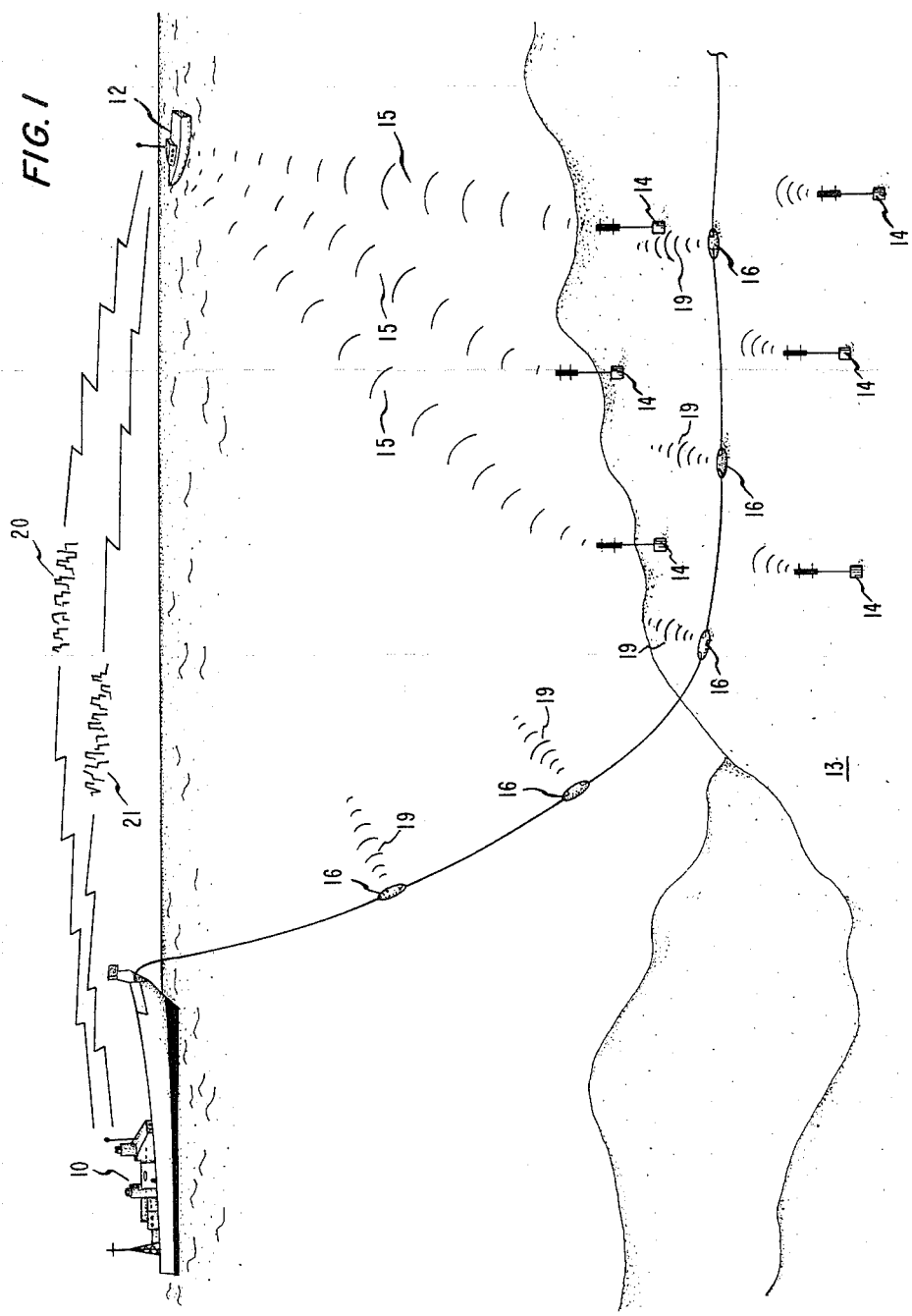
FIG. 1 is a pictorial diagram of a cable laying operation useful in providing a background setting for this invention.

FIG. 1 shows in panoramic form a submarine cable launching operation. A cable laying surface vessel 10 is deploying cable 11 over its bow sheave onto bottom 13. Above bottom 13 are floated by buoys attached to bottom anchors a plurality of precisely positioned and calibrated acoustic transponders 14, which are capable of transmitting and receiving acoustic signals in the general range of 7.5 to 16.0 kilohertz. Transponders 14 in addition are susceptible to interrogation and response at preselected frequencies. Wave fronts 15 represent underwater acoustic signals. Telemetry vessel 12 is provided with underwater transducers for handling acoustic signals, as well as transceivers for translating between underwater acoustic signals 15 and radio waves 20 and 21. Transmitted and received radio waves 20 and 21 permit two-way communication between cable vessel 10 and telemetry vessel 12.

Either or both of telemetry vessel 12 and cable vessel 10 can carry navigation and computer equipment on board to analyze acoustic data for location and tension information.

Cable 11 is shown streaming over the bow of cable vessel 10 down into the array site defined by transponders 14. A plurality of cable transponders 16 are positioned at known locations along cable 11 both within the navigation network at the arrary site defined by bottom transponders 14 and along portions of cable 11 still being deployed.

From the signals from the bottom transponders 14 a grid map of the plan of the array site can be generated. From signals from the cable transponders 16 along the catenary the location of the cable can be superimposed on the horizontal grid and a profile vertical display can further be generated. From the signals from cable transponders 16 cable tension can be monitored to assess the effects of shiphandling maneuvers and cable payout changes.

Acoustic transponders adapted to being launched from surface vessels are commercially available. These transponders are battery powered. They can be interrogated on one set of preselected pulsed frequencies. They reply on another set of preselected pulsed frequencies in the same range. Shipboard transceivers complementing the transponders and having selectable interrogate and reply frequencies with digital displays are also available commercially.

Cable transponders 16 comprise electronic apparatus similar to that found in bottom transponders 14, but on a greatly reduced scale to fit the physical limitations of the cable transponder housing. Cable transponders 16 upon interrogation transmit coded pulses on preselected reply frequencies to telemetry ship 12 by way of acoustic waves 19, in the same manner as bottom transponders 14 communicate by way of acoustic waves 15. The coded pulses are also relayed to telemetry ship 12 from bottom transponders 14, whose positions have been precisely determined. On telemetry ship 12 both sets of acoustic waves are processed by arrival times and assigned frequencies to form a geometric plot of relative locations. By comparing the direct waves from cable transponders 16 with the indirect waves repeated from bottom transponders 14 the location of cable transponders 16, and hence the cable itself, can be determined by triangulation.

Waves 19 from cable transponders 16 further provide tension information to telemetry ship 12. The processed information is further communicated from telemetry ship 12 to cable ship 10 by radio waves 20.

It is to be understood that FIG. 1 is not drawn to scale. For example, cable ship 10 and telemetry ship 12 can be separated by miles and so may be out of sight of each other. The sea bed can be three or more miles below the sea surface. Bottom transponders 14 can be separated by miles. Transponders 14 pe se are floated 100 feet or more above the sea bottom to insure reliable transmission and reception properties.

Figure 2:
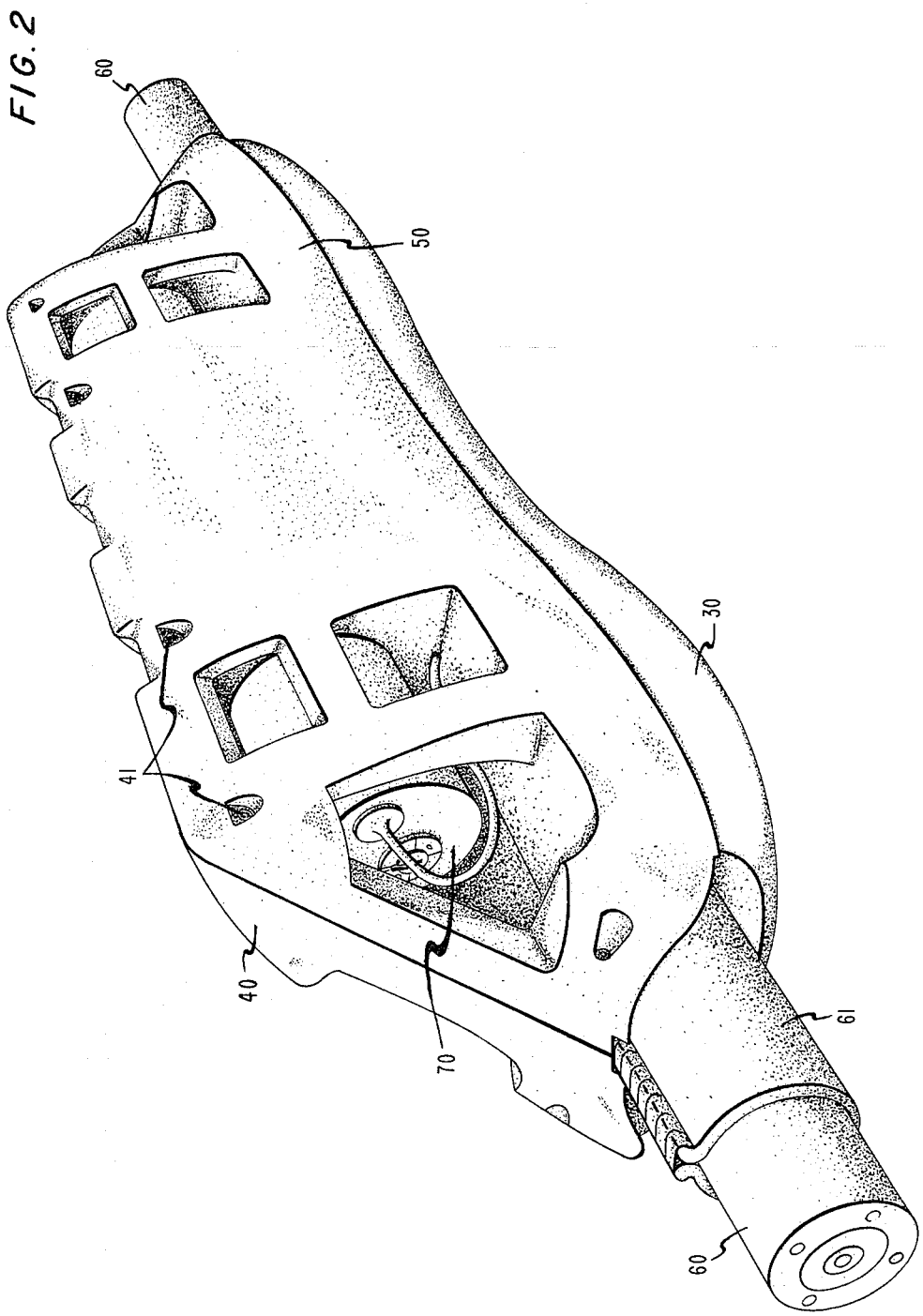
FIG. 2 is a perspective drawing of the cable tension and location acoustic telemetering apparatus of this invention.

FIG. 2 is a perspective drawing of an illustrative cable transponder 16. Cable transponder 16 comprises a three-piece housing including base 30, left quarter housing 40 and right quarter housing 50; and electronics module 70 within the housing. The illustrated three housing pieces when separated are fitted around cable 60 and secured by a plurality of recessed bolts, such as those indicated at positions 41. Shrinkable tubes 61 at each end of the housing serve to prevent slippage of the housing along cable 60 when interfering obstacles are encountered during deployment. The separable housing pieces allow installation at any position along the cable without cutting the cable or without the need to slide the pieces along the cable from an end.

Figure 3:
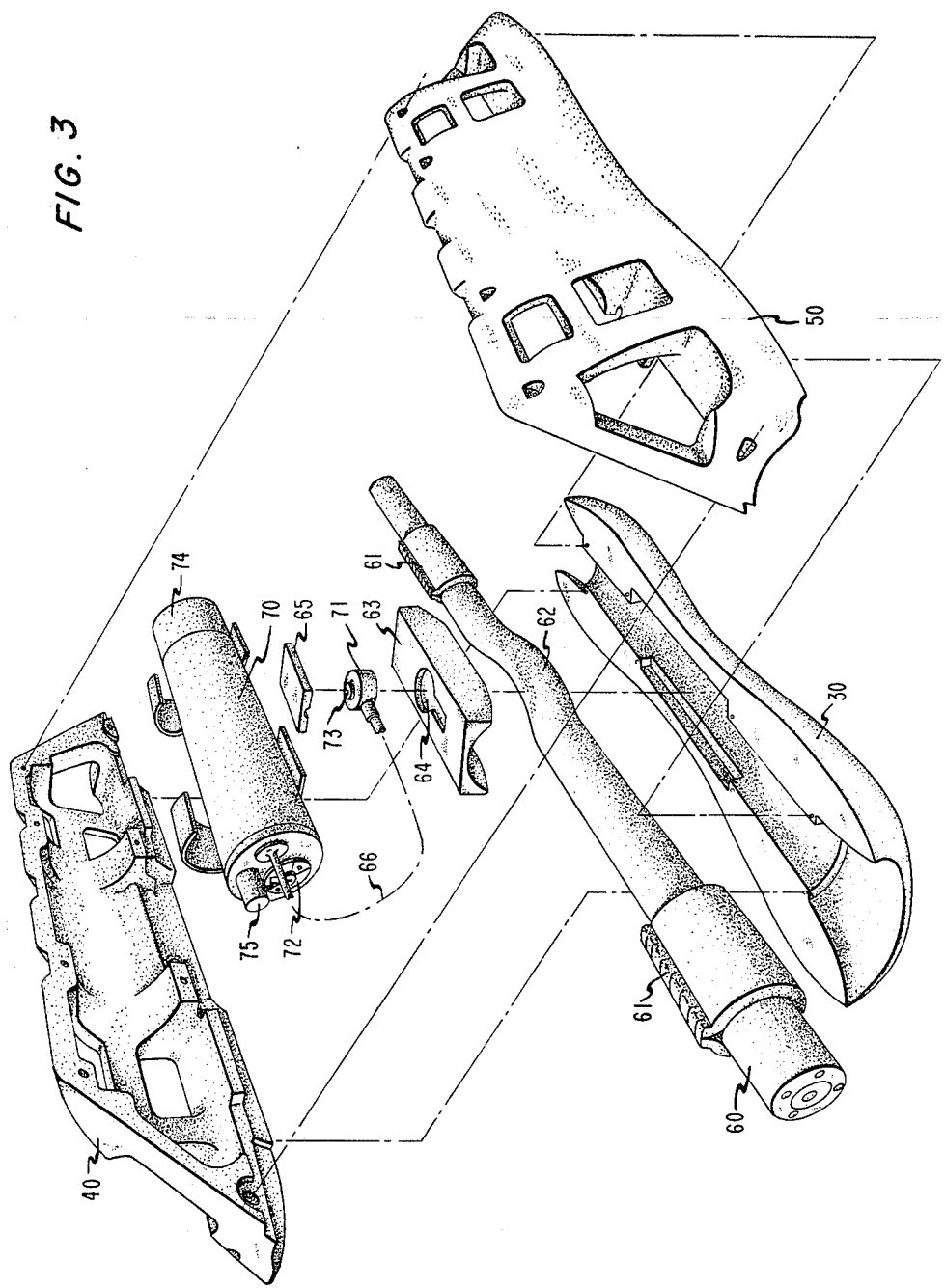
FIG. 3 is an exploded view of the cable tension and location acoustic telemetering apparatus of this invention.

FIG. 3 is an exploded view of a cable transponder 16 showing in better detail the relationships among its parts. Housing sections 30, 40 and 50 are shown unbolted and separated. Bolt hole alignments are indicated by broken lines. Cable 60 clearly has been lifted from its normal position in the grooved inner surface of base 30. Cable 60 shows protective shrink tubes 61 at the ends of housing base 30. Base 30, saddle 63 and housing quarters 40 and 50 are shaped internally so that a bow 62 is forced into cable 60 near the midpoint of base 30. Above bow 62 is placed saddle 63 which has a thickened undersurface to maintain the bow in cable 60. Saddle 63 also has a keyhole recess in its upper surface to accommodate load cell 71. Load cell 71 includes a button 73 on its upper surface which presses into a recess in backing plate 65. Load cell 71 contains a strain gauge bridge circuit, which generates an electrical signal when compressed as a function of the applied force. The strain gauge is powered and transmits the electrical signal to transponder 70 over leads 66 (shown dashed).

The arrangement shown causes a compressive force on load cell 71 when cable 60 is under tension due to a straightening tendency of its bow 62. This compressive force causes load cell 71 to be squeezed between saddle 63 and pressure plate 65. Multiconductor cable 66 supplies voltage to the strain gauge bridge within load cell 71. The balance voltage is in turn transmitted through additional conductors back to transponder 70.

Cable transponder 70 is a self-powered underwater acoustic telemetry unit packaged in a miniaturized pressure-proof cylindrical housing. Load cell 71 is connected at one end thereof by a multiconductor cable 66 (dashed line). On-off and frequency-select switch 72 is located at the same end as the load cell take-off connector. Switch 72 provides for the selection of a number of predetermined interrogation frequencies. Within end cap 74 at the opposite end of transponder 70 is an acoustic transducer. Protrusion 75 is an anodic corrosion protection device.

In operation of cable transponder 70 cable tension is measured by compression of cap 73 on load cell 71 to provide illustratively an output voltage in the range of about 0 to 20 millivolts functionally related to tension in the range of about 0 to 3000 pounds. Transponder 70 per se translates load cell output into a variable interval, i.e., by pulse modulation, between successive acoustic pulses on the order of 100 to 1000 milliseconds. The latter pulses are transmitted in response to acoustic interrogation pulses from telemetry ship 12, which carries on board appropriate transceiver equipment. The interval between acoustic response pulses is displayed on a video cathode-ray terminal included in the ship's transceiver equipment. Conversion to tension is currently made by way of calibration tables unique to each individual transponder.

The previous numerical values are intended as illustrative of a specific application of this invention, and are not intended to be limitative with respect to other applications.

For range measurements the two-way acoustic travel time between the initiation of interrogation of pulses from telemetry ship 12 and receipt of the first pulse of the two-pulse transponder reply is monitored. The known speed of sound in water (adjusted for temperature and salinity of about 4800 feet per second) is used to convert measured two-way acoustic travel time into distance. Ranges up to 10 nautical miles are currently realized in deep water, but in shallow water the range may be somewhat less.

The present embodiment of cable transponder 70 is approximately three inches in diameter and about eighteen inches in length.

Figure 4:
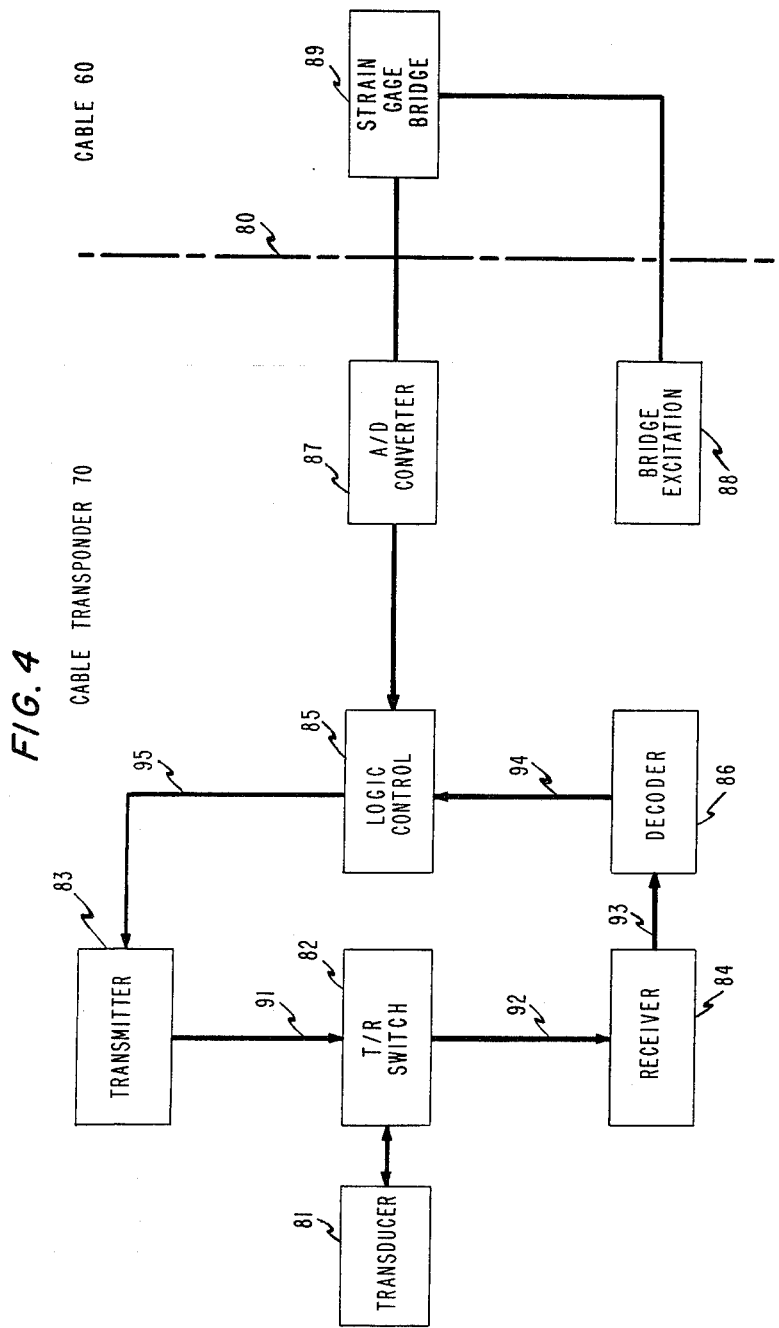
FIG. 4 is a functional block diagram of the electrical circuits of the telemetering apparatus of this invention.

Representative circuitry for transponder 70 is shown in FIG. 4 in block diagram form. The transponder comprises acoustic transducer 81, transmit/receive switch 82, transmitter 83 connected to switch 82 over lead 91, receiver 84 connected to switch 82 over lead 92, logic control 85 connected to the output of transmitter 83 over lead 95, decoder 86 connected between receiver 84 and logic control 85 over leads 93 and 94, analog-to-digital converter 87 connecting logic control 85 to strain gauge bridge 89, strain gauge bridge 89 and bridge excitation 88.

Transducer 81 can be of the piezoelectric type using a ceramic element which is protected from sea water by a suitable potting compound, such as polyurethane. Its acoustic pattern is ideally omnidirectional. Transducer 81 both transmits and receives. Transmit-receive switch 82 serves to protect receiver input circuits from overloading on transmitted pulses.

Logic control 85 evaluates and interprets the information obtained from either receiver 84 by way of decoder 86 as an interrogation signal or from converter 87 as a digitized strain gauge voltage. Receiver 84 demodulates the interrogation pulses and determines whether they encode the correct frequency assigned to the particular transponder. Decoder 86 transforms the demodulated interrogation signal into a sharp pulse of about 10 milliseconds duration for presentation to logic control 85. After a transponder turn-around time of about 17 milliseconds logic control 85 forms a sharp 10-millisecond pulse modulated on a selectable first frequency in the range of 9.0 to 11.0 kHz followed by a silent interval proportional to the voltage developed by bridge 89 and terminated by another sharp pulse of 8-millisecond duration modulated on a second frequency of about 13.5 kHz. Currently available receive frequencies can be chosen from a plurality of up to thirteen unique combinations, thus allowing selective communication with up to twelve transponders. The pulses are formed in logic control 85 and the modulation onto an acoustic carrier wave occurs in transmitter 83. Range from telemetry ship 12 can be determined from the difference in time between the launching of the interrogation pulse and the return of the first transponder pulse from a knowledge of the speed of sound in sea water. As has been previously mentioned, pulses from cable transponders 16 reach telemetry ship not only on a direct path, but also on a relayed path by way of reception and retransmission from bottom transponders 14.

Strain gauge bridge 89 is conventional in nature and is powered by a battery in bridge excitation 88. The battery typically has an operating life of seven days and a shelf life of several years. Accordingly, no power is supplied from the cable to which the transponder is attached.

While this invention has been described in terms of a specific illustrative embodiment, various modifications and adaptations can be made by those skilled in the cable handling arts without departing from the scope of the following claims.

What is claimed is:

1. In a submarine cable laying system, apparatus for measuring cable tension during laying operations comprising
   a separable housing for longitudinal attachment to a submarine cable before laying,
   a strain gauge within said housing for producing an electric magnitude proportional to tension in said cable,
   a saddle within said housing for holding said cable in a bowed condition against said strain gauge such than an increase in cable tension tends to reduce the bow in said cable and thereby increases the compressive force on said strain gauge, and
   control means for translating the electric magnitude caused by compression of said strain gauge into an acoustic signal transmissible through the submarine environment.

2. The apparatus set forth in claim 1 in which said housing comprises
   left- and right-hand quarter housings equipped with recesses for holding said saddle, said control means and said strain gauge in appropriate cooperative juxtapositions when bolted together; and
   a base housing having a trough for securing a cable whose tension is to be measured against said saddle, said base housing being boltable to said left- and right-hand quarter housings.

3. The apparatus set forth in claim 1 in which said control means includes a bilateral acoustic transducer for alternately receiving acoustic interrogation signals and transmitting acoustic response signals which encode tension magnitudes.

4. A self-powered cable tension and location telemetering apparatus comprising
   a sectional housing arranged for nondestructive attachment about a cable at an arbitrary location therealong,
   a strain gauge within said housing,
   a saddle for positioning said strain gauge to respond to changes in tension in said cable to which said housing is attached,
   a backing plate holding said strain gauge in a firm reference position, and
   a transponder including an acoustic transducer for responding to interrogation signals and transmitting reply signals indicative of tension measurements by said strain gauge and of range measurements between an interrogation source and said transponder.

5. The self-powered cable tension and location telemetering apparatus set forth in claim 4 in which said housing further comprises
   identical mating quarter housings adaptable to being bolted together, and
   a base housing to affix said quarter housings about a cable under measurement,
   said quarter housings and base housing containing concave recesses therein for accommodating a cable being monitored in a bowed condition therein such that tension in the cable tends to cause a straightening force proportional to such tension.

6. The self-powered cable tension and location telemetering apparatus set forth in claim 4 in which said transponder further comprises
   a bilateral acoustic transducer,
   means for decoding interrogation pulses,
   means for encoding tension measurements in a dual pulse format such that the time between pulses is proportional to such tension magnitude, and
   transfer switch means alternately permitting said transducer to receive acoustic interrogation signals and to transmit acoustic reply signals.

* * * * *

UNITED STATES PATENT AND TRADEMARK OFFICE
CERTIFICATE OF CORRECTION

PATENT NO. : 4,388,710

DATED : June 14, 1983

INVENTOR(S) : Joseph A. Pecon, Jr.

It is certified that error appears in the above—identified patent and that said Letters Patent is hereby corrected as shown below:

Column 1, line 10, insert --The Government has rights in this invention pursuant to Contract No. N00039-78-C-0006 awarded by the Department of the Navy.--. Column 2, line 4, after "load" insert --cell--. Column 3, line 48, "pe se" should be --per se--.

Signed and Sealed this

Eleventh Day of October 1983

[SEAL]

Attest:

Attesting Officer

GERALD J. MOSSINGHOFF

Commissioner of Patents and Trademarks